(12) United States Patent
Vinson

(10) Patent No.: US 6,406,752 B1
(45) Date of Patent: Jun. 18, 2002

(54) EXTRUSION DIE HAVING DYNAMIC FLOW INDUCER

(75) Inventor: Kenneth Douglas Vinson, Cincinnati, OH (US)

(73) Assignee: The Procter & Gamble Company, Cincinnati, OH (US)

(*) Notice: Subject to any disclaimer, the term of this patent is extended or adjusted under 35 U.S.C. 154(b) by 0 days.

(21) Appl. No.: 09/503,375

(22) Filed: Feb. 14, 2000

(51) Int. Cl.[7] .............................. B05D 3/12; B05C 3/18
(52) U.S. Cl. ................. 427/356; 425/382.4; 425/382.3; 425/466; 118/410
(58) Field of Search ...................... 427/356; 118/410; 425/466, 382.4, 382.3

(56) References Cited

U.S. PATENT DOCUMENTS

| | | |
|---|---|---|
| 3,785,179 A | 1/1974 | Davis et al. |
| 3,800,569 A | 4/1974 | Wilcox |
| 3,939,675 A | 2/1976 | Klein |
| 3,942,342 A | 3/1976 | Klein et al. |
| 4,043,739 A | 8/1977 | Appel |
| 4,059,880 A | 11/1977 | Klein |
| 4,095,444 A | 6/1978 | Pascoe, Sr. et al. |
| 4,372,739 A | 2/1983 | Vetter et al. |
| 4,376,670 A | 3/1983 | Rodish |
| 4,577,476 A | 3/1986 | Lambert et al. |
| 5,145,689 A | 9/1992 | Allen et al. |
| 5,234,330 A | 8/1993 | Billow et al. |
| 5,269,670 A | 12/1993 | Allen et al. |
| 5,295,612 A * | 3/1994 | Tagge et al. ............... 222/135 |
| 5,421,941 A | 6/1995 | Allen et al. |
| 5,445,509 A | 8/1995 | Allen et al. |
| 5,456,944 A * | 10/1995 | Trest et al. ................. 427/128 |
| 5,494,429 A | 2/1996 | Wilson et al. |
| 5,511,962 A | 4/1996 | Lippert |
| 5,522,931 A | 6/1996 | Iwashita et al. |
| 5,538,754 A * | 7/1996 | Sandock .................... 427/96 |
| 5,605,706 A | 2/1997 | Allen et al. |
| 5,607,726 A | 3/1997 | Flattery et al. |
| 5,639,514 A * | 6/1997 | Jones et al. ................ 427/318 |
| 5,740,963 A | 4/1998 | Riney |
| 5,766,356 A | 6/1998 | Kurimoto |
| 5,858,096 A | 1/1999 | Madrzak et al. |

FOREIGN PATENT DOCUMENTS

| | | |
|---|---|---|
| EP | 0 117 212 A1 | 8/1984 |
| EP | 0 474 421 A3 | 3/1992 |
| EP | 0 554 237 A1 | 1/1993 |
| GB | 1020902 | 2/1966 |
| GB | 1253229 | 11/1971 |
| JP | 6-114913 * | 4/1994 |

OTHER PUBLICATIONS

Drawings by Extrusion Dies Incorporated, 911 Kurth Road, Chippewa Falls, Wisconsin received Nov., 1998.

* cited by examiner

*Primary Examiner*—Katherine A. Bareford
(74) *Attorney, Agent, or Firm*—Vladimir Vitenberg; David M. Weirich; Ken K. Patel

(57) ABSTRACT

An extrusion die for extruding an extrudable fluid comprises a distribution channel having a discharge mouth, and a dynamic flow inducer disposed therein. The dynamic flow inducer comprises a movable member, such as, for example, a rotatable bar disposed transversely relative to the flow of the fluid through the discharge mouth. As the extrudable fluid is passing through the discharge mouth, the motion of the dynamic flow inducer retards the accumulation of contaminant and thereby prevents clogging of the extrusion die.

19 Claims, 2 Drawing Sheets

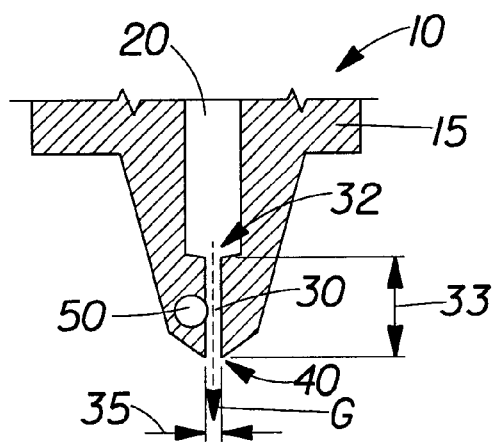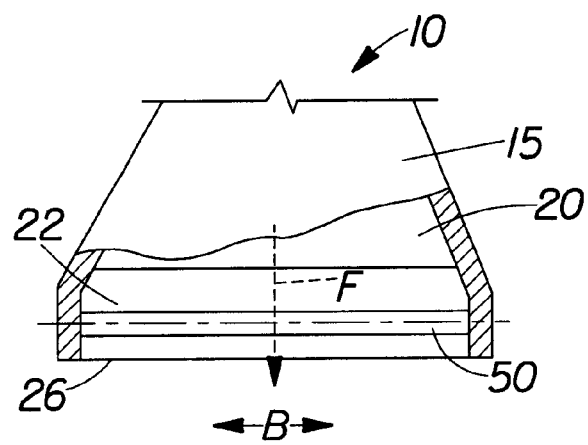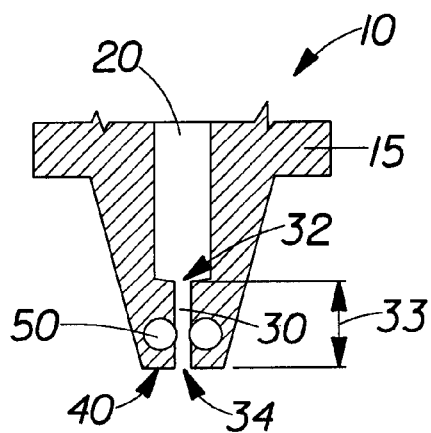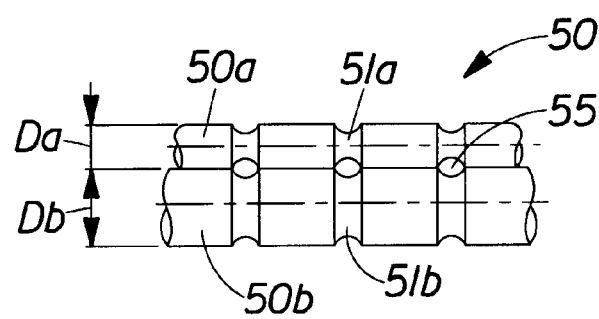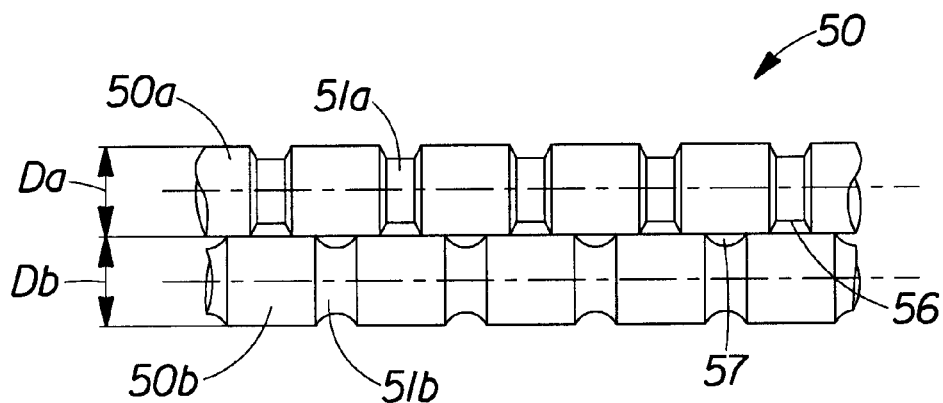

EXTRUSION DIE HAVING DYNAMIC FLOW INDUCER

FIELD OF THE INVENTION

The present invention generally relates to extrusion processes and apparatuses therefor. More specifically, the present invention is concerned with processes and apparatuses for extruding chemical functional additives used in making disposable items, such, for example, as paper toweling, napkins, toilet tissue, facial tissue, etc.

BACKGROUND OF THE INVENTION

Extrusion dies for depositing an extrudable fluid onto a substrate are known in the art. Dies of a type generally known in the art as a coat-hanger die are described, for example, in the following U.S. Pat. No. 4,043,739 issued on Aug. 23, 1997 to Appel and assigned to Kimberly-Clark Corporation; U.S. Pat. No. 4,372,739 issued on Feb. 8, 1983 to Vetter et al. and assigned to Röm GmbH of Darmstadt, Germany; U.S. Pat. No. 5,234,330 issued on Aug. 10,1993 to Billow et al. and assigned to Eastman Kodak Company; U.S. Pat. No. 5,494,429 issued on Feb. 27, 1996 to Wilson et al. and assigned to Extrusion Dies, Inc. Several other types of extrusion apparatuses are disclosed, for example, in the following U.S. Pat. No. 5,607,726 issued on Mar. 1997 to Flattery et al. and assigned to E. D. du Pont de Nemours and Company; U.S. Pat. No. 5,522,931 issued to Iwashita et al. on Jun. 4, 1996 and assigned to Konica Corporation of Japan; U.S. Pat. No. 5,740,963 issued to Riney on Apr. 21, 1998 and assigned to Nordson Corporation; U.S. Pat. No. 5,511,962 issued to Lippert and assigned to Extrusion Dies, Inc.

Extrusion dies are frequently used in dusty environments. One of the concerns relating to extrusion dies of prior art has been plugging of a die's discharge mouth, i. e., the outlet through which the extrudable fluid exits the extrusion die. In papermaking, for example, some paper webs tend to be particularly prone to release surface fibers. A dust comprising primarily papermaking fibers may cause contamination of a chemical functional additive, such as, for example, a topical tissue softener, which is routinely deposited onto the paper web. Other common contaminants may include degradation product of the extrudable fluid itself, which particularly may occur in stagnant areas around the walls of the extrusion die. Build up of these degradation products can form over a period of time, harden and eventually separate from the walls of the die, thereby becoming a contaminant. More generally, particulate soil, sand, dirt, and grit tend to become airborne in the vicinity of the extrusion operation and settle into the supply of the extrudable fluid feeding the extrusion die.

If the chemical functional softener, for example, is deposited onto a substrate by extrusion, the contaminants, which have found their way into the functional additive being extruded, may plug the discharge outlet of the extrusion die. A process of cleaning of the extrusion dies is usually costly, for it involves stoppage of a production line and/or a substantial effort. The cleaning may be further complicated in extrusion dies designed to extrude very thin layers of extrudates and therefore comprising the discharge mouths having very small, in the range of 0.0002–0.00450 inches, dimensions requiring maintenance of high-precision tolerances. As the cross-sectional area of the discharge mouth decreases, the propensity of internal clogging of the die increases. Capillary-sized discharge mouths are especially susceptible to clogging.

The disclosures of commonly-assigned patent applications Ser. No. 9/258,497 filed on Feb. 29, 1999; and Ser. No. 09/377,661 filed on Aug. 19, 1999, both applications filed in the name of the present inventor, are incorporated herein by reference.

It is believed that a dynamic flow inducer of the present invention, comprising at least one rotatable element disposed within the discharge mouth of an extrusion die, can beneficially mitigate, and even eliminate the problem of plugging of the discharge mouth. Accordingly, the present invention provides a novel dynamic flow inducer. The present invention also advantageously provides a novel extrusion apparatus comprising a discharge mouth having a dynamic flow inducer therein that retards the accumulation of contaminant and thereby prevents clogging of the extrusion apparatus's discharge moth. The present invention also provides an advantage of an extrusion process which substantially eliminates plugging of the discharge mouth of the extrusion apparatus.

Other objects, features, and advantages of the present invention will be readily apparent from the following description taken in conjunction with accompanying drawings, although variations and permutations may be had without departing from the spirit and scope of the disclosure.

SUMMARY OF THE INVENTION

The present invention provides an extrusion die comprising a supply port and a distribution channel in fluid communication with the supply port. The distribution channel terminates with at least one discharge mouth having a passage cross-section therethrough. The discharge mouth comprises an entry orifice, an exit orifice, a discharge distance therebetween, and a dynamic flow inducer. The dynamic flow inducer comprises a movable member and is positioned such as to form the narrowest section of the discharge mouth. In some embodiments, the dynamic flow inducer partially obstructs the flow of the fluid being discharged. The movement of the dynamic flow inducer substantially decreases and even negates the possibility that contaminants in the fluid will accumulate and clog the discharge mouth.

In one embodiment of the present invention, the dynamic flow inducer comprises a bar that is rotated in a direction concurrent with the flow. In another embodiment, the dynamic flow inducer comprises a bar that is translated along its longitudinal axis. The dynamic flow inducer may comprise a plurality of the rotatable bars. For example, in one embodiment, two rotatable bars are disposed on mutually opposite sides of the discharge mouth. The rotatable bars may have grooves thereon of differential shapes (such as, for example, circular and rectangular), and differential configurations (such as, for example, radial and helical).

In some embodiments, the rotatable bar or bars may be disposed substantially perpendicular to the general direction of the flow of the extrudable fluid within the discharge mouth. However, it is contemplated in the present invention that the rotatable bar or bars can be disposed such as to form an acute angle or angles between the bar's axis of rotation and the general direction of the flow of the extrudable fluid.

The rotatable bar(s) can be structured to move in a direction different from that of the extrudable fluid, for example in the direction transverse to the flow of the extrudable fluid. In one embodiment, the rotatable bar is biased within the discharge mouth of the extrusion die to move transversely thereby widening the passage cross section of the discharge mouth.

The present invention further provides a process for extruding an extrudable fluid used in making a disposable paper product. The process comprises the steps of providing an extrudable fluid, providing an extrusion die equipped with the dynamic flow inducer of the present invention, and extruding the fluid with the extrusion die. The present invention also teaches that internal clogging of the extrusion die can be prevented by applying a reverse (or back) pressure to the fluid in the extrusion die, thereby displacing larger contaminants which tend to accumulate at the entry orifice of the discharge mouth.

The present invention also teaches a process for depositing a chemical functional additive onto a web substrate. The process comprises the steps of providing a web substrate; providing an extrusion die having a dynamic flow inducer of the present invention; providing the chemical functional additive selected from the group consisting of softeners, emulsions, emollients, lotions, topical medicines, soaps, anti-microbial and anti-bacterial agents, moisturizers, coatings, inks and dyes, and binders; extruding the functional additive with the extrusion die while facilitating passage of at least some of the contaminants contained in the functional additive, and depositing the functional additive extrudate onto the web substrate. In a preferred embodiment, the web substrate is moving in a machine direction.

BRIEF DESCRIPTION OF THE DRAWINGS

FIG. 1 schematically shows an extrusion die of the present invention comprising a dynamic flow inducer.

FIG. 2 schematically shows a cut-away view of the extrusion die of the present invention.

FIG. 3 schematically shows another embodiment of the extrusion die of the present invention, having a dynamic flow inducer comprising two rotatable bars.

FIG. 4 schematically shows an embodiment of the dynamic flow inducer of the present invention, comprising two juxtaposed rotatable bars, each having a plurality of grooves thereon, the grooves of one bar being aligned with the grooves of the other bar.

FIG. 5 schematically shows an embodiment of the dynamic flow inducer of the present invention, similar to that of FIG. 4, but having grooves which are staggered.

DETAILED DESCRIPTION OF THE INVENTION

Figure 7:
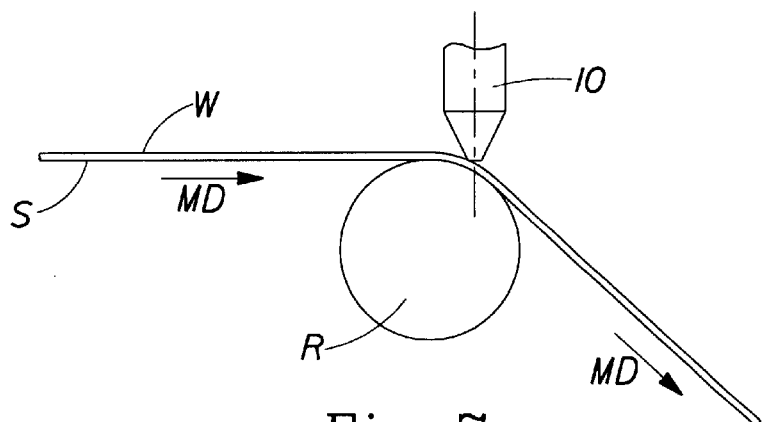
FIG. 7 schematically shows an embodiment of a process of the present invention.

An extrusion die 10 of the present invention may be utilized to extrude an extrudable fluid onto a carrier W (FIG. 7). As used herein, the term "extrudable fluid" refers to any fluid, including liquid, as well as gaseous material, which is capable of being extruded using the extrusion die 10. The examples of the extrudable fluid include, but are not limited to: water; alcohol; functional additives, such as softeners (siloxanes, oils, quaternary ammonium compounds, waxes, and others), emulsions, emollients, lotions, topical medicines, soaps, various anti-microbial and anti-bacterial agents, and moisturizers (for example, glycols); fillers, such, for example, as clay slurry; a variety of resins; coatings, such, for example, as clay and latex, and various opacifiers; inks and dyes; binders; reactive and non-reactive vapors, such, for example, as oxygen and nitrogen. One typical extrudable fluid comprises a chemical functional additive commonly used in making consumer disposable articles, such as paper toweling, napkins, toilet tissue, facial tissue, sanitary napkins, diapers, etc. The extrudable fluid may be selected from the group consisting of softeners, emulsions, emollients, lotions, topical medicines, soaps, anti-microbial and anti-bacterial agents, moisturizers, coatings, inks and dyes, and binders.

As used herein, the term "carrier" is generic and refers to any medium onto which the extrudate may be deposited according to the process of the present invention. A variety of materials may be used as the carrier W. Examples include but are not limited to: paper; fabric; plastic, including film; metal; wood; woven and non-woven materials. The carrier W may comprise the web substrate (as schematically shown in FIG. 7), or alternatively—a printing roll (not shown). Structured papers, as well as non-structured papers, may be used as the carrier W. Several examples of the structured papers may be found in the following commonly assigned U.S. Pat. No. 4,529,480 issued Jul. 16, 1985 to Trokhan; U.S. Pat. No. 4,637,859 issued Jan. 20, 1987 to Trokhan; U.S. Pat. No. 5,364,504 issued Nov. 15, 1994 to Smurkoski, et al.; U.S. Pat. No. 5,529,664 issued Jun. 25, 1996 to Trokhan, et al.; and U.S. Pat. No. 5,679,222 issued Oct. 21, 1997 to Rasch, et al., the disclosures of which patent are incorporated herein by reference.

Two embodiments of the carrier W comprise a transfer roll (not shown) and a web substrate (FIG. 7). One skilled in the art will appreciate that a transfer roll, such as, for example, an off-set roll, may be used in a printing process for indirect application of the extrudate to the substrate. An embodiment of a web substrate could be a fibrous web, such as, for example, a paper web. It is to be understood, however, that the extrusion die 10 and the process of the present invention may be beneficially used with various types of the extrudable fluids and various types of the substrates. Other examples of the papers that may be used as the substrate 16 are described in the following U.S. Pat. No. 3,301,746 issued Jan. 31, 1967 to Sanford, et al.; U.S. Pat. No. 3,974,025 issued Aug. 10, 1976 to Ayers; U.S. Pat. No. 4,191,609 issued Mar. 04, 1980 to Trokhan; and U.S. Pat. No. 5,366,785 issued Nov. 22, 1994 to Sawdai, the disclosures of which are incorporated by reference herein. One-ply, as well as multi-ply, webs may be used as the substrate in the present invention.

The extrusion die 10 of the present invention comprises a housing 15, a supply port (not shown), a distribution channel 20 and a discharge mouth 30. As one skilled in the art will recognize, the term "supply port" refers to an inlet in the body of the extrusion die 10, through which an extrudable fluid is supplied, typically under pressure, into the housing 15. The supply port is in fluid communication with the distribution channel 20.

As used herein, "fluid communication" refers to a continuous fluid path between at least two elements or locations.

As used herein, the term "distribution channel" refers to a three-dimensional space, or hollowness, within the die 10, structured and configured to receive the extrudable fluid and to "distribute" it within the housing 15. In some embodiments, such, for example, as the coat-hanger-type dies, referred to herein above, the distribution channel 20 facilitates distribution of the extrudable fluid in a widthwise directions (schematically designated as "B" in FIG. 2).

The distribution channel 20 terminates with at least one discharge mouth 30 having a passage cross-section 35 for the extrudable fluid to pass therethrough. As used herein, the term "discharge mouth" refers to an end portion of the distribution channel 20 and includes an opening, or hole, in a lip 40, through which opening the extrudable fluid exits the die 10, thereby forming an extrudate. The discharge mouth 30 includes an entry orifice 32, an exit orifice 34, and a discharge distance 33 formed between the entry orifice 32 and the exit orifice 34. As used herein, the term "lip" refers to a furthermost outer portion of the extrusion die 10, relative to a general direction F of a flow of the extrudable fluid at the point of exiting the die 10.

In one embodiment, the housing 15 of the extrusion die 10 comprises a one-piece body. However, the extrusion die may also be formed by two matching halves; a general design that one skilled in the art will readily recognize. Each of the halves has a cavity therein such that when the halves are sealed together, their cavities form the distribution channel 20, including the discharge mouth 30.

At any point along its path, the passage cross-section 35 is typically measured in square units of an open area formed by an imaginary plane which is generally perpendicular to the flow of the extrudable fluid through the discharge mouth 30. One skilled in the art will appreciate that within the discharge distance 33 of the discharge mouth 30, i. e., between the entry orifice 32 and the exit orifice 34, there may be virtually unlimited number of cross-sectional open areas.

In accordance with the present invention, a dynamic flaw inducer 50 is provided within the discharge mouth 30. The dynamic flow inducer 50 comprises a member movable within the discharge mouth 30 of the die 10. In the embodiments shown in FIGS. 1–6, the dynamic flow inducer 50 comprises at least one rotatable bar disposed substantially perpendicular, as viewed in both mutually perpendicular cross-sections (FIG. 1 and FIG. 2), to the general direction F of the flow of the extrudable fluid through the discharge mouth 30. It is to be understood, however, that embodiments are possible in which in at least the cross-section shown in FIG. 2 the dynamic flow inducers rotatable bar can be inclined and form an acute angle relative to the general direction of the flow of the extrudable fluid through the discharge mouth 30. The latter embodiment is not shown but can be easily visualized by one skilled in the art.

Figure 8:
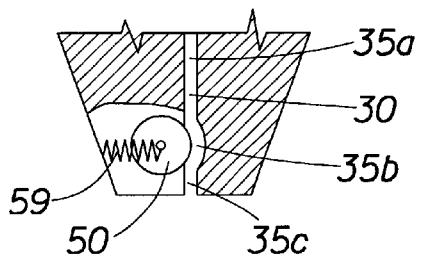
FIG. 8 schematically shows an embodiment of the extrusion die having a dynamic flow inducer, wherein a discharge mouth of the die has a substantially constant passage cross-section.

The dynamic flow inducer 50 is preferably located at the point of narrowest passage cross-section 35. Moreover, the dynamic flow inducer 50 can even reduce the passage cross section, if the dynamic flow inducer 50 extends beyond a surface of the discharge mouth 30 (FIG. 3). In other embodiments, the shape of the discharge mouth 30 can be designed and structured such that at the point where the dynamic flow inducer 50 is located the passage cross-section 35 is not reduced relative to the rest of the discharge mouth 30, and may be is even enlarged. For example, FIG. 8 schematically shows a fragment of the discharge mouth 30 and the inducer 50 comprising a rotatable bar extending from the inner surface of the discharge mouth 30. The discharge mouth 30 shown in FIG. 8 is curving around a portion of the inducer 50 such that the passage cross-section 35 is substantially the same along the discharge distance, i. e., an upstream passage cross-sections 35a, an intermediate passage cross-section 35b, and a downstream passage cross-section 35c are substantially equal.

In some embodiments, while the extrusion die 10 is in operation, the dynamic flow inducer 50 is in motion. If the inducer 50 comprises a rotatable bar, the preferred motion of the inducer 50 is rotation that is concurrent with the flow of the extrudable fluid. As used herein, by the term "concurrent" rotational movement it is meant that the trajectory of every portion of the surface of the dynamic flow inducer 50 which is in contact with the flow of the extrudable fluid does not include a vector component that directly opposes the vector of the general direction of the flow of the extrudable fluid through the discharge mouth 30.

Figure 9:
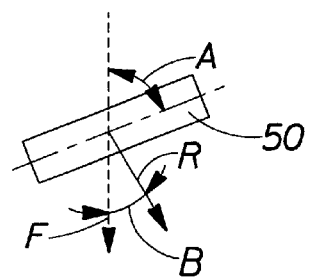
FIG. 9 schematically shows a rotatable bar of the dynamic flow inducer, disposed at an acute angle relative to the flow of the extrudable fluid.

In FIG. 9, for example, the dynamic flow inducer 50 is angled relative to the flow of the extrudable fluid, i. e., the central axis of the inducer 50 and the direction of the flow of the fluid form therebetween an acute angle "A". If the inducer 50 comprises a rotatable bar, the rotation is "concurrent" as long as an angle "B" formed between a surface vector R of the rotational movement of the inducer 50 and a vector of the general direction F of the flow of the extrudable fluid is less than 90 degrees. Without wishing to be limited by theory, applicant believes that since there is an angle formed between the vector of the movement of the inducer 50 and the vector F of the direction of the fluid, the fluid that is in contact with the moving surface of the inducer 50 is subjected to two forces having different directions: one—caused by movement of the inducer 50 (vector R), and the other—caused by the pressure within the housing 15 (vector F).

As the extrudable fluid passes through the discharge mouth 30 equipped with the dynamic flow inducer 50, the motion of the dynamic flow inducer 50 reinforces the flow of the fluid. Thus, contaminants contained in the fluid are subjected to both the force created by the flow of extrudable fluid and the force created by the motion of the dynamic flow inducer 50. These forces increase the likelihood that any particle of contaminant will be ejected from the discharge mouth 30.

It is to be understood that the rotatable bar of the dynamic flow inducer 50 may, in some embodiments, be idle while the flow of the extrudable fluid is passing through the discharge mouth 30. It is believed that in such embodiments the dynamic flow inducer 50 will still facilitate passage of the contaminants through the discharge moth 30, because in such embodiments, a contaminant contacting the rotatable bar, under the pressure developed within the discharge mouth 30, is believed to be able to cause rotation (albeit limited) of the bar concurrent with the movement of the flow. Consequently, friction forces affecting the passage of the contaminant through the discharge mouth 30 will be reduced. It is also contemplated that, depending on the specific requirements of a particular process, the rotatable bar may be rotated at a velocity different from the velocity of the fluid passing through the discharge moth.

Depending on the specific requirements of a particular extrusion process, the discharge mouth 30 may comprise a variety of shapes and configurations. For example, the discharge mouth 30, in its cross-section perpendicular to the flow of the extrudable fluid, may have a circular shape, or an elongate slot (oval, rectangular, etc.). Other variations and permutations of shapes of the discharge mouth 30, including rectangular and irregular configurations (not shown) of the open areas, are included in the scope of the present invention.

Present invention contemplates the dynamic flow inducer 50 comprising several rotatable bars. For example, FIG. 3 shows an embodiment of the extrusion die 10 having two mutually opposite rotatable bars. It should be understood the rotatable bars do not need to be mutually opposite, but may, in some embodiments, be staggered (not shown).

FIG. 8 shows an embodiment of the dynamic flow inducer 50 of the present invention, comprising a rotatable bar which is also movable in at least a first direction transverse to the direction of the flow of the extrudable fluid. As used herein, the term "transverse" means non-parallel, and more specifically, within the range of from about +45 degrees to about −45 degrees relative to a reference direction (e. g., the direction of the flow). In one embodiment, the first direction is a direction within the range from about +65 degrees to about −75 degrees, and more specifically, from about +80 degrees to about −80 degrees. Typically, the first direction is substantially perpendicular to the axis of rotation of the rotatable bar.

In FIG. 8 the rotatable bar is biased against the housing 15 with the use of a spring 59, but it is to be understood that other conventional means, such as, for example, hydraulic, pneumatic, magnetic, electrical, electronic, and any combination thereof, may be used to cause the rotatable bar to move in the direction transverse to the direction of the fluid. In such and similar embodiments, the rotatable bar can yield to a pressure developed by the flow of the fluid and/or contaminants within the discharge mouth 30, and thereby even further facilitate passage of the contaminants through the discharge mouth 30. Alternatively, the rotatable bar can be designed to be affirmatively moved when necessary to disgorge the contaminants. Prophetically, such a movement of the rotatable bar may be caused manually by an operator when desirable upon observation of the process, or automatically. The automatic movement may prophetically be caused by a flow-detecting device that monitors the flow of the extrudable fluid and effectuates the movement of the rotatable bar when the flow is less than a predetermined value. Alternatively, the automatic movement may prophetically be caused by a sensor that, upon sensing the presence of contaminants in the flow through the discharge mouth 30, gives a signal to automatically effectuate the movement of the rotatable bar. All of the foregoing embodiments and their permutations are within the scope of the present invention.

Figure 6:
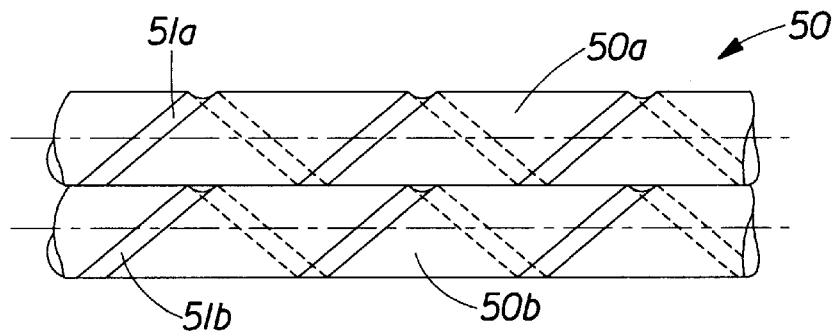
FIG. 6 schematically shows another embodiment of the dynamic flow inducer of the present invention, comprising a pair of juxtaposed rotatable bars, each having at least one helix, or spiral, groove.

Several embodiments of the dynamic flow inducer 50 of the present invention, shown in FIGS. 4, 5, and 6, comprise rotational bars having grooves (51a, 51b) thereon. Those embodiments are shown as comprising two mutually juxtaposed rotatable bars, but it is to be understood that flow inducers 50 comprising singular rotatable bar having the grooves are also contemplated by the present invention, as well as the inducers 50 having non-abutting (i. e., having no points of contact) plurality of the rotatable bars.

The grooves may have a variety of shapes and configurations. FIGS. 4 and 5 show grooves 51a and 51b having a circular cross-sectional shape and a radial configuration. As used herein, the term "shape" pertains, in the context of the grooves, to the cross-sectional image of the grove viewed in a cross-section parallel to and laying in the same plane as the rotational axis of the bar. The term "configuration" in the context of the of the grooves pertains to the overall pattern of the groove throughout the length of the groove. By way of example, FIG. 5 shows the grooves 51a having substantially rectangular cross-sectional shape and a radial configuration; and grooves 51b, having a substantially circular shape and radial configuration.

The mutually juxtaposed bars, shown in FIGS. 4, 5, and 6, may have differential diameters. For example, in FIG. 4, a diameter Da of the bar 51a is shown smaller than a diameter Db of the bar 50b; while in FIG. 5, the diameter Da of the bar 51a is shown greater than the diameter Db of the bar 50b. Also, while in FIG. 4 the juxtaposed bars 50a and 50b have mutually corresponding grooves 51a and 51b, respectively, in FIG. 5 the grooves 51a and 51b are staggered. FIG. FIG. 6 schematically shows another embodiment of the dynamic flow inducer 50 of the present invention, comprising a pair of juxtaposed rotatable bars 50a and 50b, each having at least one helix, or spiral, groove 51a and 51b, respectively.

One skilled in the art will be able to visualize other variations and permutations of the shapes and configurations of the grooves, as well as of mutual juxtaposition of the bars, all of which are within the scope of the present invention. It is believed that these differential configurations and permutations can create differential patterns of the extrudate on the carrier W.

The process of the present invention comprises the following steps: providing an extrudable fluid; providing the extrusion die 10 described herein above, the extrusion die having a distribution channel 20 terminating with at least one discharge mouth 30, the extrusion die 10 comprising at least one dynamic flow inducer 50 disposed within the discharge mouth 30, the dynamic flow inducer 50 being structured and configured to move within the discharge mouth 30 concurrently with the flow of the extrudable fluid; extruding the extrudable fluid through the discharge mouth 30 of the extrusion die 10, wherein the dynamic flow inducer 50 is moving and facilitating the passage of at least some of relatively large contaminants contained in the extrudable fluid through the discharge mouth 30, thereby plugging of the discharge mouth 30 is substantially avoided.

In some embodiments of the process of the present invention, the lip 40 of the extrusion die 10 may contact the carrier W, such as, for example, a substrate. In the embodiment of the die 10 comprising two halves, the lip 40 may be formed by at least one of a leading lip (belonging to one of the halves) and a trailing lip (belonging to the other of the halves). In one embodiment of the die 10 according to the present invention, the lip 40 comprises a "knife edge" i. e., a relatively sharp surface formed by two surfaces connected at an angle (FIG. 1).

In FIG. 7, the carrier W comprising a web substrate is shown as moving in a machine direction MD. As used herein, the term "machine direction" indicates a direction which is parallel to the flow of the carrier W through the equipment. In some embodiments of the process according to the present invention, the extrusion apparatus 10 may be disposed relative to the substrate 16 such that the outlet width B is parallel to the cross-machine direction CD. The term "cross-machine direction" indicates a direction which is perpendicular to the machine direction and lies in the general plane of the carrier. It should be noted, however, that other embodiments are possible, and may be even desirable, in which the outlet is disposed such that the outlet width (i. e., the widthwise direction) is not parallel to the cross-machine direction CD, i. e., the direction of the outlet width B and the cross-machine direction CD form an acute angle therebetween (not shown).

During the process, at least some of relatively large contaminants contained in the extrudable fluid, i. e., those contaminants that have at least one dimension which is greater than at least one dimension of the entry open area, are precluded from entering the discharge mouth. At the same time, at least some of relatively small contaminants, i. e., the contaminants having at least one dimension which is less than at least one dimension of the entry open area, pass through the discharge mouth without being obstructed therein. It is believed that during the described process using the extrusion die of the present invention, plugging of the discharge mouth is substantially reduced or even avoided.

Some of the contaminants that are precluded from entering the discharge mouth 30 may still be disposed in the proximity of the entry orifice 32 thereof, thus restricting flow of the extrudable fluid through the discharge mouth 30. To ameliorate this problem, a reverse pressure (or "back pressure") may, for a short period of time, be applied to the extrudable fluid inside the distribution channel 20, thereby displacing such relatively large contaminants which are located at the proximity of the entry orifice 32 of the discharge mouth 30.

What is claimed is:

1. A process for extruding an extrudable fluid, the process comprising steps of:
    (a) providing an extrudable fluid;
    (b) providing an extrusion die having a distribution channel terminating with at least one discharge mouth, the extrusion die comprising at least one dynamic flow inducer disposed within the discharge mouth, the dynamic flow inducer being structured and configured to move within the discharge mouth concurrently with a flow of the extrudable fluid;
    (c) extruding the extrudable fluid through the discharge mouth of the extrusion die, wherein the dynamic flow inducer is moving and facilitating the passage of at least some of relatively large contaminants contained in the extrudable fluid through the discharge mouth, thereby plugging of the discharge mouth is substantially avoided.

2. The process according to claim 1, further comprising a step of moving the dynamic flow inducer within the discharge mouth of the distribution channel.

3. A process for depositing a chemical functional additive onto a web substrate, the process comprising steps of:
    (a) providing a web substrate;
    (b) providing an extrusion die comprising a housing having therein a distribution channel terminating with a discharge mouth, and a dynamic flow inducer disposed in the discharge mouth and comprising a movable member structured and configured to move within the discharge mouth;
    (c) providing a chemical functional additive selected from the group consisting of softeners, emulsions, emollients, lotions, topical medicines, soaps, antimicrobial and anti-bacterial agents, moisturizers, coatings, inks and dyes, and binders, the functional additive being extrudable with the extrusion die;
    (d) extruding the chemical functional additive with the extrusion die through the discharge mouth thereof while simultaneously moving the dynamic flow inducer concurrently with a flow of the chemical functional additive through the discharge mouth to facilitate a passage of relatively large contaminants contained in the functional additive through the discharge mouth, thereby sufficiently avoiding plugging of the discharge mouth;
    (e) contacting the web substrate with the functional additive being extruded with the extrusion die, thereby depositing the functional additive onto the web substrate.

4. The process according to claim 3, wherein the step of providing an extrusion die comprises providing the extrusion die having the dynamic flow inducer comprising a rotatable bar.

5. The process according to claim 4, wherein the step of extruding the functional additive while simultaneously moving the dynamic flow inducer comprises rotating the rotatable bar concurrently with the flow of the extrudable fluid.

6. The process according to claim 3, further comprising a step of continuously moving the web substrate in a machine direction and relative to the discharge mouth of the extrusion die.

7. An extrusion die for extruding an extrudable fluid, the extrusion die comprising a housing and a distribution channel therein, the distribution channel terminating with at least one discharge mouth having a passage cross-section therethrough for providing a flow of the extrudable fluid through the discharge mouth, the discharge mouth further having an entry orifice, an exit orifice, and a discharge distance defined therebetween, wherein the extrusion die further comprises at least one dynamic flow inducer disposed in the discharge mouth intermediate the entry orifice and the exit orifice such as to form a minimal passage cross-section within the discharge mouth, the dynamic flow inducer comprising a movable member structured and configured to move in a direction concurrent with the flow of the extrudable fluid through the discharge mouth.

8. The extrusion die according to claim 7, wherein the passage cross-section of the discharge mouth is substantially constant along the discharge distance.

9. The extrusion die according to claim 7, wherein the dynamic flow inducer comprises at least one bar rotatable along its longitudinal axis and concurrently with the flow of an extrudable fluid being discharged.

10. The extrusion die according to claim 9, wherein the at least one rotatable bar of the dynamic flow inducer is disposed substantially perpendicular to the flow of the extrudable fluid through the discharge mouth of the extrusion die.

11. The extrusion die according to claim 9, wherein the at least one rotatable bar of the dynamic flow inducer is disposed at an acute angle relative to the flow of the extrudable fluid through the discharge mouth of the extrusion die.

12. The extrusion die according to claim 9, wherein the rotatable bar has at least one groove thereon.

13. The extrusion die according to claim 12, wherein the at least one groove has a substantially circular configuration.

14. The extrusion die according to claim 12, wherein the at least one groove has a helical configuration.

15. The extrusion die according to claim 7, wherein the dynamic flow inducer comprises a plurality of rotatable bars.

16. The extrusion die according to claim 15, wherein the dynamic flow inducer comprises at least two rotatable bars disposed at mutually opposite sides of the passage cross-section.

17. The extrusion die according to claim 7, wherein the movable member of the dynamic flow inducer is structured to move in a direction different from the direction of the flow of the extrudable fluid.

18. The extrusion die according to claim 17, wherein the movable member of the dynamic flow inducer is movable in a direction transverse to the direction of the flow of the extrudable fluid, thereby increasing the passage cross-section through the discharge mouth.

19. A dynamic flow inducer, in combination with an extrusion die having a discharge mouth, for facilitating a passage of an extrudable fluid containing contaminants through the discharge mouth, the dynamic flow inducer comprising at least one rotatable bar supported within the discharge mouth of the extrusion die, the rotatable bar having an axis of rotation which is substantially perpendicular to a flow of the extrudable fluid through the discharge mouth, wherein the rotatable bar is structured and configured to rotate concurrently with the flow of the extrudable fluid.

* * * * *